UNITED STATES PATENT OFFICE.

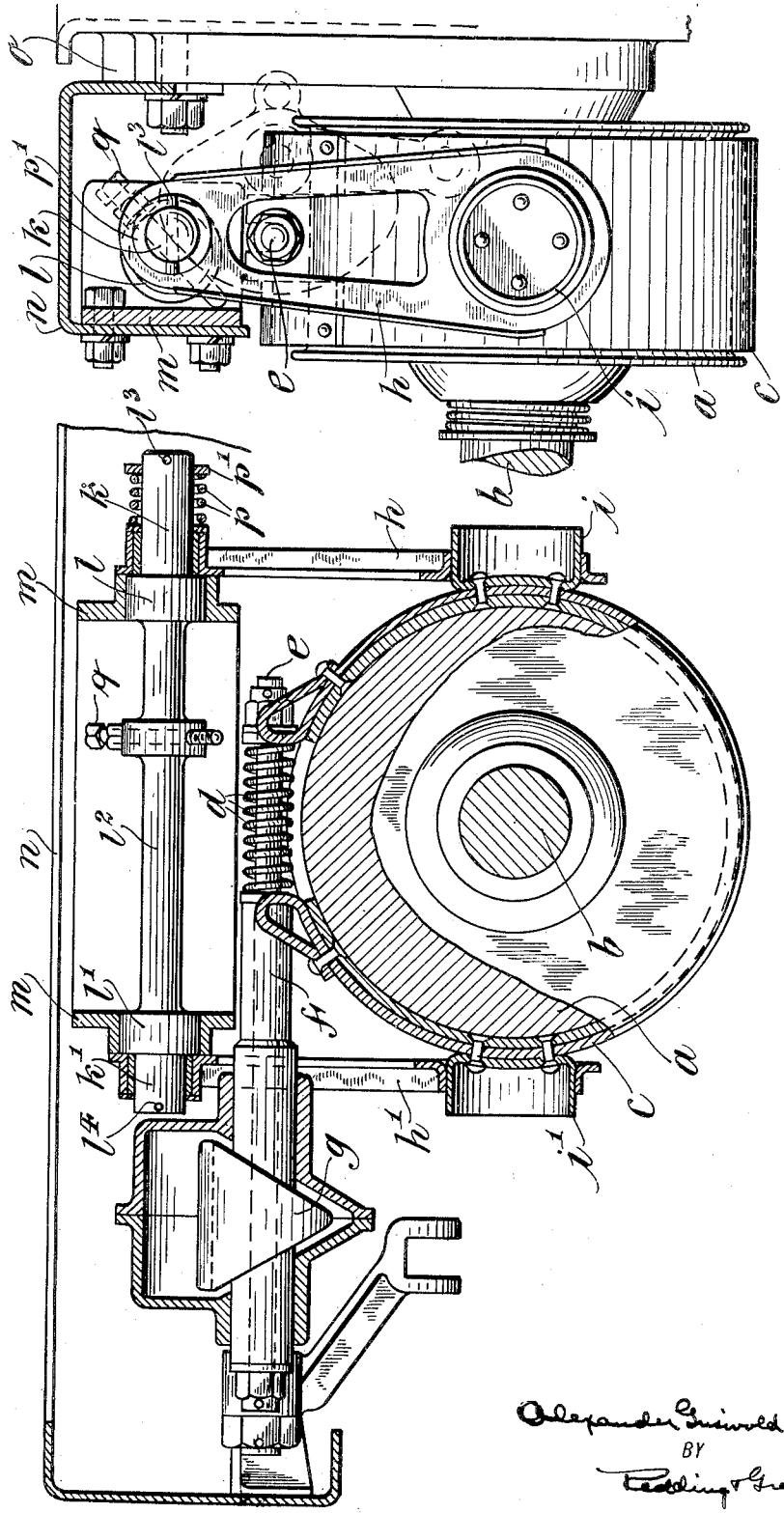

ALEXANDER GRISWOLD HERRESHOFF, OF NEW YORK, N. Y., ASSIGNOR TO INTERNATIONAL MOTOR COMPANY, OF NEW YORK, N. Y., A CORPORATION OF DELAWARE.

BRAKE-BAND CARRIER.

1,306,899.　　　　　Specification of Letters Patent.　　Patented June 17, 1919.

Application filed April 7, 1919.　Serial No. 288,408.

*To all whom it may concern:*

Be it known that I, ALEXANDER GRISWOLD HERRESHOFF, a citizen of the United States, residing in the borough of Manhattan of the city of New York, in the State of New York, have invented certain new and useful Improvements in Brake-Band Carriers, of which the following is a specification, reference being had to the accompanying drawing, forming a part hereof.

This invention relates to carriers for brake bands and has for one of its objects to provide a carrier which shall permit of the ready adjustment of the band with relation to the drum so as to insure a complete and uniform clearance of the band when released. A further object is to provide devices operative upon application of the brake to relieve the support for the band of the usual stresses imposed by the torque reaction. It is known that such stresses quickly wear the bands and distort them as well as strain the support therefor. In carrying out the second named object of the invention, supporting devices for the band are provided which shall be so interconnected as to receive the torque reaction at different sides of the axis of the band and place the torque reaction on each such support in opposition to the torque reaction on one or more other such supports and thereby neutralize it and relieve the band of the usual stresses resulting from this torque reaction. The invention will be described with greater particularity in connection with the embodiment illustrated in the accompanying drawing, in which—

Figure 1 is a fragmentary view partly in section and partly in elevation showing the improved carrier as applied to an external brake band.

Fig. 2 is a fragmentary view partly in transverse section and partly in side elevation of the carrier shown in Fig. 1.

While it will be understood that the improved carrier may be applied to brakes operating under any conditions, for convenience, its application herein is in connection with the brake drum for a motor truck. The drum $a$ is mounted on a shaft $b$ and has coöperating therewith an external brake band $c$ of any usual form. This brake band is normally held in released position by a spring $d$ which acts upon an operating rod $e$ and sleeve $f$ secured respectively to the ends of the band. The band may be drawn into braking engagement with the periphery of the drum by operation of a wedge-shaped member $g$ operatively engaged with the sleeve $f$ and the rod $e$ in a manner which is old and forms no part of the present invention. The band $c$ is supported at opposite sides of the axis of the drum $a$ by means of carriers $h$, $h'$, in the lower ends of which are mounted loosely cups $i$, $i'$, secured to the brake band. The carriers $h$, $h'$ are carried on and depend from arms $k$, $k'$ respectively, formed on eccentrics $l$, $l'$ of the shaft $l^2$, the eccentrics being journaled in a bracket $m$ carried on a channel member $n$ secured to any available portion of the chassis $o$. The axes of the arms $k$, $k'$ of the eccentrics $l$, $l'$ are coincident as are the axes of the eccentrics $l$, $l'$. The shaft $l^2$, considered as a whole, is held yieldingly in the bracket $m$ against axial movement by means of a spring $p$ which seats on a washer $p'$ adjacent the end of the arm $k$, the movement of the washer being limited by means of a pin $l^3$ in the end of the arm. This axial movement, under the influence of the spring $p$, is limited by means of a pin $l^4$ at the outer end of the arm $k'$.

In operation, it will be evident that lateral movement of the band during application and release will be compensated for fully by the limited lateral movement of the carriers $h$, $h'$ permitted on the arms $k$, $k'$ by the spring $p$. When the brake is applied, assuming the shaft $b$ to be rotating in a clockwise direction the torque reaction to the right of the axis tends to pull the carrier $h$ downward while the torque reaction to the left of the axis tends to force the arm $h'$ upward. Since these carriers are supported on the arms $k$, $k'$ of the eccentrics $l$, $l'$ and the axes of the arms $k$, $k'$ are coincident, the downward pull of the carrier $h$, communicated through the shaft $l^2$, is entirely neutralized by the upward thrust of the carrier $h'$ on this shaft. All of the strains, therefore, which ordinarily are imposed on the brake band or its support are entirely eliminated and the torque reaction at one side of the band is made to oppose and neutralize the torque reaction at the other side of the band. In known constructions it has been usual for the torque reaction at opposite sides of the axes of the band to supplement each other rather than to oppose each other as in the present embodiment.

Another feature of the invention relates to a simple means for adjusting the clearance of the band from the drum and insuring the desired clearance uniformly about the circumference of the drum. This means comprises, in the illustrated embodiment, an adjustable bolt or set screw $q$ which passes through the shaft $l^2$ and has its end in such relation to the bracket $m$ as to limit the rotative movement of the shaft in one direction. When the brake is released under the influence of the spring $d$ or is applied through operation of the wedge member $g$ it will be evident that the carrier arms $h, h'$ are moved up or down thereby rocking the shaft $l^2$ in one direction or the other. The tendency of the spring $d$, in the absence of limiting means, is to effect a greater clearance of the brake band upon release than is necessary or desirable. The amount of clearance permitted can be limited by limiting the angular movement of the shaft $l^2$ and this is done in the improved construction by so adjusting the bolt $q$ as to have its end engage with the bracket $m$ when the desired clearance has been attained. Not only is a nice adjustment of the clearance thereby insured but uniform clearance throughout the extent of the band is given since the movement of each carrier $h, h'$ is the same, this movement depending in each case upon the degree of rotation of the shaft $l^2$.

As pointed out hereinbefore, the improvements are not limited to the precise embodiment illustrated nor to the character of the brake or its application since it will be evident that other forms of the parts may be employed for the same purpose and the neutralizing action of the component forces of the torque reaction secured with other arrangements of the carrier arms. It will also be evident that the devices might be employed with internal brake bands. Reference is to be had to the appended claims for a definition of the scope of the invention.

I claim as my invention:

1. In combination with a brake drum, band and operating devices therefor, means to support the band, and means to equalize the opposite torque reactions on the supporting means.

2. In combination with a brake drum, band and operating devices therefor, means to support the band which comprise carrier arms secured thereto at opposite sides of the axis, and means to support said carrier arms and equalize the opposite torque reactions thereon.

3. In combination with a brake drum, band and operating devices therefor, means to support the band which comprise carrier arms secured thereto at opposite sides of the axis, a shaft, and eccentrics on the shaft having their axes coincident, the carrier arms being supported on said eccentrics.

4. In combination with a brake drum, band and operating devices therefor, means to support the band which comprise carrier arms secured thereto at opposite sides of the axis, a shaft, and eccentrics on the shaft having their axes coincident, the carrier arms being supported on said eccentrics, and yielding means to permit limited lateral movement of the arms upon application and release of the band.

5. In combination with a brake drum, external band and operating devices therefor, means to support the band which comprise carrier arms, cups secured to the band at diametrically opposite sides of the axis and mounted in the arms, a shaft, a bracket in which the shaft is rotatively journaled, eccentric arms on the ends of the shaft having their axes coincident, the carrier arms being supported on said eccentrics, and a spring operatively interposed between the shaft and the carrier arms to permit lateral movement thereof upon application and release of the band.

6. In combination with a brake drum, band and operating devices therefor, means to support the band which comprise carrier arms secured thereto at opposite sides of the axis, a shaft, and eccentrics on the shaft having their axes coincident, the carrier arms being supported on said eccentrics, and an adjustable screw carried in the shaft to limit its rotation upon release of the band to determine the clearance thereof from the drum.

This specification signed this 31 day of March, A. D. 1919.

ALEXANDER GRISWOLD HERRESHOFF.